United States Patent
Tsai et al.

(10) Patent No.: US 8,417,510 B2
(45) Date of Patent: Apr. 9, 2013

(54) VOCABULARY GENERATING APPARATUS AND METHOD, SPEECH RECOGNITION SYSTEM USING THE SAME

(75) Inventors: Ching-Ho Tsai, Huatan Township, Changhua County (TW); Liang-Sheng Huang, Taipei (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 1591 days.

(21) Appl. No.: 11/288,728

(22) Filed: Nov. 28, 2005

(65) Prior Publication Data

US 2006/0167679 A1 Jul. 27, 2006

(30) Foreign Application Priority Data

Jan. 27, 2005 (TW) ................................ 94102410 A

(51) Int. Cl.
*G06F 17/27* (2006.01)
*G10L 19/00* (2006.01)

(52) U.S. Cl.
USPC ............................................... 704/9; 704/201

(58) Field of Classification Search ................ 704/9, 10, 704/201, 243
See application file for complete search history.

(56) References Cited

U.S. PATENT DOCUMENTS

| | | | |
|---|---|---|---|
| 5,218,668 A | 6/1993 | Higgins et al. | 704/200 |
| 6,088,669 A * | 7/2000 | Maes | 704/231 |
| 7,120,582 B1 * | 10/2006 | Young et al. | 704/255 |
| 2002/0123876 A1* | 9/2002 | Pokhariyal et al. | 704/1 |
| 2006/0074671 A1* | 4/2006 | Farmaner et al. | 704/257 |

* cited by examiner

*Primary Examiner* — Angela A Armstrong
(74) *Attorney, Agent, or Firm* — J.C. Patents

(57) ABSTRACT

A vocabulary generating method and apparatus and a speech recognition system using the same are disclosed. In the vocabulary generating method, a new system vocabulary can be generated to increase the flexibility of the speech recognition system, so a user, when unsure of a system command, can use a specially defined "unknown code word" (UCW) for the undetermined part in the command.

30 Claims, 1 Drawing Sheet

VOCABULARY GENERATING APPARATUS AND METHOD, SPEECH RECOGNITION SYSTEM USING THE SAME

CROSS-REFERENCE TO RELATED APPLICATION

This application claims the priority benefit of Taiwan application serial no. 94102410, filed on Jan. 27, 2005. All disclosure of the Taiwan application is incorporated herein by reference.

BACKGROUND OF THE INVENTION

1. Field of the Invention

The present invention relates to a speech recognition system and a vocabulary generating apparatus and method. In particular, it relates to a vocabulary generating apparatus and method, and a speech recognition system using the same. The vocabulary generating method is capable of increasing the flexibility of the speech recognition system, so that the user, when unsure of the system command, can still use the "unknown code word (UCW)" for an undetermined part.

2. Description of the Related Art

With the advancement in technology, the speech recognition system can help users operate related apparatus, such as television, stereo system, and other electronic devices. To conveniently operate these apparatuses, the users only need to follow the recognizable speech commands. In addition to the electric devices, the speech recognition technology is also widely applied in the related fields, such as identity recognition, or speech input, etc.

However, one of the most common problems with the speech conventional recognition system is that a user does not know or forget the speech command while operating the speech recognition system. Nevertheless, the recognizable scope of a speech recognition system is limited to the predetermined vocabulary and syntax. Therefore, if the user is not sure that some vocabulary is acceptable or not by the system, the user can not use these vocabulary which causes the user can not enjoy the convenience provided by the speech recognition system.

SUMMARY OF THE INVENTION

The present invention provides a vocabulary generating apparatus and method, and a speech recognition system using the same. The vocabulary generating method is capable of increasing the flexibility of the speech recognition system, so that the user, when unsure of the speech command, can use a specifically defined "unknown code word (UCW)", for an undetermined part.

To achieve the above-mentioned object, the present invention provides a vocabulary generating apparatus, comprising a tokenize unit, an UCW database and a vocabulary generating unit. The tokenize unit is used for receiving a plurality of vocabulary from the original system, tokenizing the vocabulary and generating a plurality of meaningful units (MUs) corresponding to each vocabulary from the original system. The UCW database is used for saving a plurality of UCWs. The vocabulary generating unit is connected to the tokenize unit and the UCW database to receive the above-mentioned MUs and the UCWs, and to combine the vocabulary so that the above-mentioned MUs generated by the tokenize unit and the UCWs are combined to form a plurality of new vocabulary.

The tokenize unit in the above-mentioned vocabulary generating apparatus generates a plurality of MUs, comprising words or terms, corresponding to each the original system vocabulary.

The original system vocabulary in the above-mentioned vocabulary generating apparatus is a plurality of system vocabulary in the vocabulary database of the original system in a speech recognition system.

The vocabulary generating unit in the above-mentioned generating vocabulary apparatus receives and combines the MUs and UCWs to generate a new system vocabulary, by abandoning some MUs, and replacing them with some UCWs.

The vocabulary generating unit in the above-mentioned vocabulary generating apparatus receives and combines the MUs and UCWs to generate a new system vocabulary, by abandoning some MUs and adding some UCWs for replacement.

The vocabulary generating unit in the above-mentioned vocabulary generating apparatus receives and combines the MUs and UCWs to generate a new system vocabulary, by adding one or more UCWs in the MUs.

The vocabulary generating unit in the above-mentioned vocabulary generating apparatus receives and combines the MUs and UCWs to generate a new system vocabulary, by recomposing the MUs, and adding the UCWs for generating a new system vocabulary. In the above-mentioned vocabulary generating apparatus, in an embodiment, some MUs can be omitted, and the remaining MUs are recomposed, or the UCWs are added for generating a new system vocabulary.

To achieve the above-mentioned object, the present invention provides a vocabulary generating method suitable for a speech recognition system with a vocabulary database from the original system. The method comprises tokenizing a plurality of vocabulary from the original system database and generating a plurality of MUs corresponding to each vocabulary from the original system. The method further comprises combining the vocabulary of both MUs and UCWs, so that the MUs generated by the tokenize unit and the UCWs are combined into a plurality of new system vocabulary, which is provided to the speech recognition system.

In the above-described vocabulary generating method, the generated MUs corresponding to each original system vocabulary are a plurality of words or terms.

In an embodiment, the above-described vocabulary generating method comprises combining the vocabulary of both MUs and UCWs for generating a new system vocabulary, by abandoning some MUs, and replacing them with some UCWs, or abandoning some MUs and adding some UCWs as replacement, or in an embodiment, adding the UCWs into the MUs.

In an embodiment, the MUs are directly added into the plurality of UCWs. In another embodiment, MUs are recomposed in advance, then added into a UCW or a plurality of UCWs for generating a new system vocabulary.

To achieve the above-mentioned object, the present invention provides a speech recognition system with a vocabulary generating method. The system comprises an original system vocabulary database, an UCW database, a tokenize unit and a vocabulary generating unit. The original system vocabulary database is used for saving a plurality of original system vocabulary. The UCW database is used for saving a plurality of UCWs. The tokenize unit is used for receiving the above-mentioned original system vocabulary, tokenizing the vocabulary and generating a plurality of MUs corresponding to each original system vocabulary. And the vocabulary generating unit is connected to the tokenize unit and the UCW database to receive MUs and UCWs, and combine the vocabulary so that the MUs generated by the tokenize unit and the UCWs are combined into a plurality of new system vocabulary.

In the above-described speech recognition system, in an embodiment, the vocabulary generating unit thereof receives and combines the MUs and UCWs for generating a new system vocabulary, by abandoning some MUs, and replacing them by some UCWs.

In the above-described speech recognition system, in an embodiment, the vocabulary generating unit thereof receives and combines the MUs and UCWs for generating a new system vocabulary by abandoning some MUs and adding some UCWs for replacement.

In the above-described speech recognition system, in an embodiment, the vocabulary generating unit thereof receives and combines MUs and UCWs for generating a new system vocabulary by adding a UCW or a plurality of UCWs into the MUs.

In the above-described speech recognition system, in an embodiment, the vocabulary generating unit thereof receives and combines the MUs and UCWs for generating a new system vocabulary, by recomposing the MUs, and adding them to the UCWs to generate the new system vocabulary.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The present invention provides a vocabulary generating method, a vocabulary generating apparatus and a speech recognition system using the same. The vocabulary generating method is capable of increasing the flexibility of the speech recognition system, so that the user, when unsure of a speech command, can use the specifically defined "unknown code word" (UCW) for an undetermined part.

Figure 1:
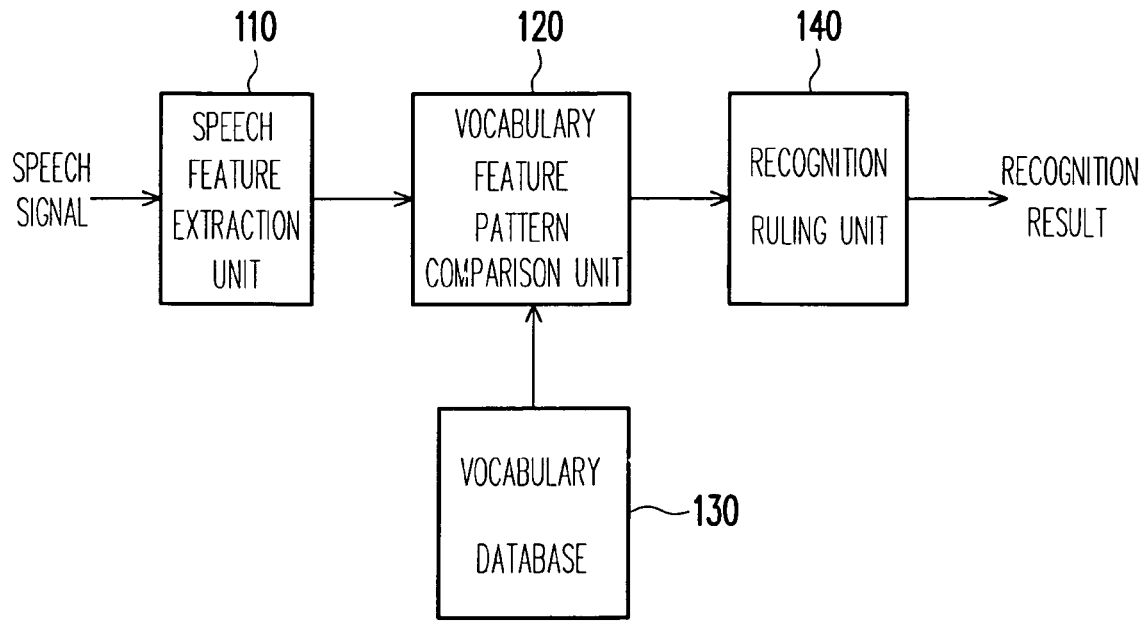
FIG. 1 is a flow chart showing the main processes of speech recognition.

The main process flow of the speech recognition system is shown in FIG. 1. After a stream of speech signal is input, a speech feature extraction unit 110 in a speech recognition system 100 extracts the features of the speech signal. Then, the feature extracted from the speech signal is compared with the system vocabulary and the feature patterns by a vocabulary feature pattern comparison unit 120 in the speech recognition system 100. The system vocabulary and its feature patterns are stored in the vocabulary database 130. After the comparison the vocabulary feature pattern comparison unit 120 outputs the feature pattern candidates for the stream of speech signal to a decision rule unit 140 to obtain a recognized text corresponding to the speech signal according to preset rules.

The so-called vocabulary feature patterns are formed by all feature patterns of every vocabulary, which are predefined by the system for recognition. Therefore, when the features of a stream of speech signal input are identical or similar to a feature pattern, the stream of speech signal can be recognized as a vocabulary corresponding to the feature pattern. On the contrary, if the speaker is not sure of the vocabulary predefined by a system, and says a word or a vocabulary not predefined in the system, the feature will not correspond to any pattern, and thus yields no result.

Taking the U.S. Pat. No. 5,218,668 as an example, wherein during a vocabulary feature pattern comparison, the feature of a speech signal is compared with both the system vocabulary and the filler to determine the recognition result. The problem is, however, when a speaker does not know part of the system vocabulary, the spoken speech signal is either recognized as a filler or other system vocabulary, even if the speaker knows most of the system vocabulary.

To increase the flexibility of the speech recognition system, an unknown code word (UCW) is used, so that a speaker can use a vague syntax for queries if not sure of the system vocabulary. Wherein, an UCW is a preset phrase or a plurality of preset phrases, and used for substituting an uncertain part of a vocabulary.

For a Chinese user, for example, "shenme" (a Chinese word, meaning "what") is often used for an undetermined word or term. As a user queries about "Zhao Meng-Fu", a painter in the Yuan dynasty, the user may suddenly forget the pronunciation of the third character "Fu", or may not be sure of the pronunciation of the third character, which is not a common word.

According to the embodiment of the present invention, the speaker can say "Zhao Meng shenme" as the query. After the recognition system obtains the recognized result, the system can start the search using the information of both ""趙 (Zhao)" and ""孟 (Meng)"".

Figure 2:
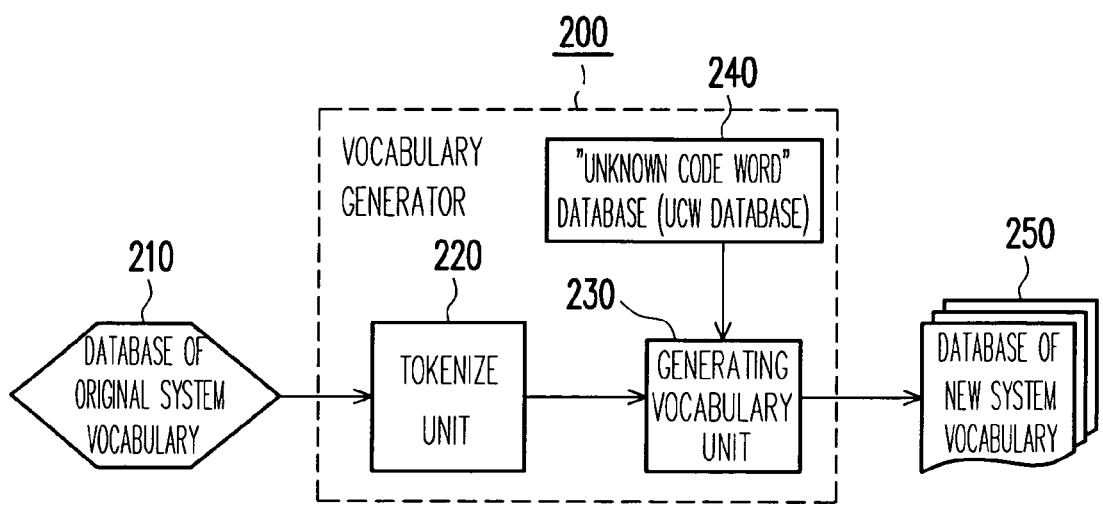
FIG. 2 is a circuit block showing a vocabulary generating apparatus and method in an embodiment of the present invention.

Referring to FIG. 2, a circuit block showing a vocabulary generating apparatus and method in an embodiment of the present invention is shown. The vocabulary generating apparatus 200 comprises a tokenize unit 220, a vocabulary generating unit 230 and an "unknown code word" (UCW) database 240. In the vocabulary generating apparatus and method in an embodiment of the present invention, first of all, the tokenize unit 220 is connected to an original system vocabulary database 210 for receiving the system vocabulary. The original system vocabulary database 210 is the system vocabulary database originally equipped in the speech recognition system. And, the UCW database 240 contains the vocabulary predefined by the system and a plurality of vocabulary defined by the user.

The tokenize unit 220 tokenizes the received system vocabulary by dividing up an individual system vocabulary into smaller, meaningful units (MUs). The so-called MU can be a word or a term depending on the requirement of the entire recognition system.

Afterward, the vocabulary generating unit 230 receives the MUs produced by the tokenize unit 220, and combines a vocabulary according to the contents of the UCW database 240, thereby combining the tokenize result and the UCW to generate the new system vocabulary, which is output to the new system vocabulary database 250.

In an embodiment, a new system vocabulary is generated by abandoning some MUs, and replacing them with UCWs. For example, ""亡羊補牢 (wang-yang-bu-lao)" (a Chinese idiom, meaning "to mend the sheepfold after losing the sheep") can generate ""亡什麼補牢 wang shenme bu-lao)" (""羊 (yang)" is replaced by an UCW ""什麼 (shenme)"") and ""什麼補牢 (shenme bu-lao)" (""亡羊 (wang-yang)" is replaced by an UCW ""亡羊 (shenme)""). This is the fundamental idea of the present invention, by using UCWs to increase the flexibility of the speech recognition system. By this way, a user can use a vague syntax for query when not sure of the system vocabulary.

In another embodiment, some MUs can be abandoned for generating a new system vocabulary. For example, the term ""中華民國專利公報 (Zhuanli gongbao)" (Patent Gazette of Republic of China) can yield the terms ""專利公報 (zhuanli gongbao)" (patent gazette) and ""中華專利公報 (zhonghua zhuanli gongbao)" (Chinese patent gazette), etc. That is to say, a speaker, when not sure of the system vocabulary, can use a vague syntax for query, such as the UCWs, to increase the flexibility of the speech recognition system. Also, an original system vocabulary can be recomposed to generate new system vocabulary.

In an embodiment of the present invention, for generating a new vocabulary, an UCW can be directly inserted. For example, the term ""專利公報 (zhuanli gongbao)" (patent gazette) can yield the terms ""專利什麼公報 (zhuanli shenme gongbao)" (patent-what-gazette) and ""什麼專利公報 (sheme zhuanli gongbao)" (what-patent-gazette), etc.

In another embodiment of the present invention, the sequence of MUs can be switched for generating new vocabulary. For example, the term ""中華民國專利 公報 (zhonghuaminguo zhuanli gongbao)" (Patent Gazette of Republic of China) can yield the term ""專利什麼中華民國公報 (zhuanli shenme zhonghuaminguo gongbao)" (patent-what Republic of China gazette).

The UCWs of the present invention allows a speaker to use a vague syntax for query when not sure of the system vocabulary. In an embodiment, one or more UCWs can be added for generating new vocabulary. For example, the term ""中華民國專利 公報 (zhonghuaminguo zhuanli gongbao)" (Patent Gazette of Republic of China) can yield a new vocabulary ""中華民國什麼 專利什麼公報 (zhonghuaminguo shenme zhuanli shenme gongbao)" (Republic of China-what-patent-what-gazette). Accordingly, a more flexible speech recognition system can be achieved. Also, like the previously discussed, the term "" 中華民國專利公報 (zhonghuaminguo zhuanli gongbao)" (Patent Gazette of Republic of China) can yield the terms ""專利什麼公報 (zhuanli shenme gongbao)" (patent-what-gazette) and ""中華專利什麼 公報 (zhonghua zhuanli shenme gongbao)" (Chinese-patent-what-gazette).

The vocabulary generating apparatus and method provided by the invention is mainly used for generating a new system vocabulary database. In the following, how the generated new system vocabulary data are applied in an actual speech recognition system is discussed. Taking a speech recognition system for television programs as an example, the TTV airs six news programs in one day, including ""早安您好六點半新聞 (zao'an ninhao liu-dian-ban xinwen)" ("Good morning, 6:30 AM news"), ""早安您好七點新聞 (zao'an ninhao qi-dian xinwen)" ("Good morning, 7:00 AM new"), ""台視台語新聞(taishi taiyu xinwen)" ("TTV Taiwanese news"), ""台視 1200 午間新聞(tishi yi-er-ling-ling wujian xinwen)" ("News at noon 12:00 PM"), ""午安您好-台視新聞 (wu'an ninhao-taishi xinwen)" ("Good afternoon, TTV news") and ""台視晚間新聞 (taishi wanjian xinwen)" ("News at the evening"). For a viewer to remember the complete list to use the speech recognition system is very inconvenient. But, following the present invention, the above-mentioned six program titles can be processed and a plurality of new system vocabulary can be generated, such as ""早安什 (zao'an shenine xinwen)" (good morning-what-news), ""早安您好什麼新聞 (zoa'an ninhao shenme xinwen)" (good morning-what-news), ""台視什麼新聞 (taishi shenme xinwen)" (TTV-what-news), ""台視新聞 (taishi xinwen)" (TTV news), ""台視午間什麼 新聞 (taishi wujian shenme xinwen)" (TTV-noon-what-news) and ""什麼台語新聞 shenme taiyu xinwen)" (what-Taiwanese-news). Then, a user can use such newly added vocabulary for query. For example, ""早安什麼新聞 (zao'an shenme xinwen)" (good morning-what-news) can be referred to ""早安您好六點 半新聞 (zao'an ninhao liu-dian-ban xinwen)" (Good morning, 6:30 AM news) and ""早安您好七點新聞 (zao'an ninhao qi-dian xinwen)" (Good morning, 7:00 AM news), the system would list the two programs on the screen for the user to select. And ""早安您好七點新聞 (shenme taiyu xinwen)" (what-Taiwanese news) would be referred to ""台視台語新聞 (taishi taiyu xinwen)" (TTV Taiwanese news). Thus, the number of system vocabulary can be referred to a single program, or a plurality of programs. The advantage of such kind of system vocabulary is that the user does not nee to memorize a full system vocabulary to use the system, but only an important part of a system vocabulary. Consequently, by using the speech recognition system in the vocabulary generating apparatus and method, the flexibility of the speech recognition system can be increased. Accordingly, a user, when unsure of a speech command is acceptable to be recognized by the system, can still use a specially defined UCW to replace the undetermined portion in a command, and the convenience purpose is achieved.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A vocabulary generating apparatus, comprising:
   a tokenize unit for receiving a plurality of original system vocabulary, and tokenizing the original system vocabulary by splitting each original system vocabulary to a plurality of meaningful units (MUs) corresponding to each original system vocabulary;
   an "unknown code word" database (UCW database) for saving a plurality of unknown code words (UCWs), wherein each of said UCWs is a vocabulary self-defined by users; and
   a vocabulary generating unit connected to said tokenize unit and said UCW database for receiving said MUs and said UCWs, and for replacing said MUs by at least one of said UCWs to generate a plurality of new system vocabulary.

2. The vocabulary generating apparatus as recited in claim 1, wherein said tokenize unit generates a plurality of words corresponding to said MUs according to each original system vocabulary.

3. The vocabulary generating apparatus as recited in claim 1, wherein said tokenize unit generates a plurality of terms corresponding to said MUs according to each original system vocabulary.

4. The vocabulary generating apparatus as recited in claim 1, wherein said original system vocabulary is a plurality of system vocabulary in an original system vocabulary database of a speech recognition system.

5. The vocabulary generating apparatus as recited in claim 1, wherein said vocabulary generating unit receives and combines said MUs and said UCWs to generate said new system vocabulary by adding said UCWs.

6. The vocabulary generating apparatus as recited in claim 1, wherein said vocabulary generating unit receives and combines said MUs and said UCWs, to generate said new system vocabulary by abandoning some MUs and replacing them with some UCWs.

7. The vocabulary generating apparatus as recited in claim 1, wherein said vocabulary generating unit receives and combines said MUs and said UCWs to generate said new system vocabulary by abandoning some MUs and adding said UCWs as replacement.

8. The vocabulary generating apparatus as recited in claim 1, wherein said vocabulary generating unit receives and combines said MUs and said UCWs to generate said new system vocabulary by directly adding said UCWs into said MUs.

9. The vocabulary generating apparatus as recited in claim 1, wherein said vocabulary generating unit receives and combines said MUs and said UCWs to generate said new system vocabulary by directly adding a plurality of said UCWs into said MUs.

10. The vocabulary generating apparatus as recited in claim 1, wherein said vocabulary generating unit receives and combines said MUs and said UCWs to generate said new system vocabulary by recomposing said MUs and then directly adding them to said UCWs.

11. The vocabulary generating apparatus as recited in claim 1, wherein said vocabulary generating unit receives and combines said MUs and said UCWs to generate said new system vocabulary by omitting and then recomposing some MUs.

12. A vocabulary generating apparatus, comprising:
  a tokenize unit for receiving a plurality of original system vocabulary, and tokenizing the original system vocabulary by splitting each original system vocabulary to a plurality of meaningful units (MUs) corresponding to each original system vocabulary, wherein said original system vocabulary is a plurality of system vocabulary in an original system vocabulary database of a speech recognition system;
  an "unknown code word" database (UCW database) for saving a plurality of unknown code words (UCWs), wherein each of said UCWs is a vocabulary self-defined by users; and
  a vocabulary generating unit connected to said tokenize unit and said UCW database for receiving said MUs and said UCWs, and for replacing said MUs by at least one of said UCWs to generate a plurality of new system vocabulary.

13. A vocabulary generating method suitable for a speech recognition system with an original system vocabulary database, the method comprising:
  tokenizing a plurality of original system vocabulary in said original system vocabulary database by splitting each original system vocabulary to a plurality of MUs corresponding to each original system vocabulary; and
  replacing said MUs by at least one of a plurality of UCWs to generate a plurality of new system vocabulary to provide to said speech recognition system for speech recognition purpose, wherein each of said UCWs is a vocabulary self-defined by users.

14. The vocabulary generating method as recited in claim 13, wherein a plurality of words corresponding to said MUs is generated according to each original system vocabulary.

15. The vocabulary generating method as recited in claim 13, wherein a plurality of terms corresponding to said MUs is generated according to each original system vocabulary.

16. The vocabulary generating method as recited in claim 13, wherein said MUs and said UCWs are combined to generate said new system vocabulary, by abandoning some MUs and replacing them with some UCWs.

17. The vocabulary generating method as recited in claim 13, wherein said MUs and said UCWs are combined to generate said new system vocabulary, by abandoning some MUs and adding said UCWs as replacement.

18. The vocabulary generating method as recited in claim 13, wherein said MUs and said UCWs are combined to generate said new system vocabulary, by adding said UCW into said MUs.

19. The vocabulary generating method as recited in claim 13, wherein said MUs and said UCWs are combined to generate said new system vocabulary by adding a plurality of said UCWs into said MUs.

20. The vocabulary generating method as recited in claim 13, wherein said MUs and said UCWs are combined to generate said new system vocabulary, by recomposing said MUs and then directly adding them to said UCWs.

21. The vocabulary generating method as recited in claim 13, wherein said MUs and said UCWs are combined to generate said new system vocabulary by omitting and then recomposing some MUs.

22. The vocabulary generating method as recited in claim 13, wherein said MUs and said UCWs are combined to generate said new system vocabulary by adding said UCWs.

23. A speech recognition system with a vocabulary generating apparatus, comprising:
  an original system vocabulary database for saving a plurality of original system vocabulary;
  an "unknown code word" database (UCW database) for saving a plurality of UCWs, wherein each of said UCWs is a vocabulary self-defined by users;
  a tokenize unit used for receiving a plurality of original system vocabulary, tokenizing the vocabulary by splitting each original system vocabulary to a plurality of meaningful units (MUs) corresponding to each original system vocabulary; and
  a vocabulary generating unit connected to said tokenize unit and said UCW database for receiving said MUs and said UCWs, and for replacing said MUs by at least one of said UCWs to generate a plurality of new system vocabulary.

24. The speech recognition system as recited in claim 23, wherein said vocabulary generating unit receives and combines said MUs and said UCWs to generate said new system vocabulary by abandoning some MUs and replacing them with some UCWs.

25. The speech recognition system as recited in claim 23, wherein said vocabulary generating unit receives said MUs and said UCWs to generate said new system vocabulary by abandoning some MUs and adding said UCWs as replacement.

26. The speech recognition system as recited in claim 23, wherein said vocabulary generating unit receives and combines said MUs and said UCWs to generate said new system vocabulary by directly adding said UCWs into said MUs.

27. The speech recognition system as recited in claim 23, wherein said vocabulary generating unit receives and combines said MUs and said UCWs to generate said new system vocabulary by directly adding a plurality of said UCWs into said MUs.

28. The speech recognition system as recited in claim 23, wherein said vocabulary generating unit receives and combines said MUs and said UCWs to generate said new system vocabulary by recomposing said MUs and directly adding them to said UCWs.

29. The speech recognition system as recited in claim 23, wherein said vocabulary generating unit receives and combines said MUs and said UCWs to generate said new system vocabulary by omitting and then recomposing some MUs.

30. The speech recognition system as recited in claim 23, wherein said vocabulary generating unit receives and combines said MUs and said UCWs to generate said new system vocabulary by adding said UCWs.

* * * * *